(12) United States Patent
Gao et al.

(10) Patent No.: US 11,769,480 B2
(45) Date of Patent: Sep. 26, 2023

(54) METHOD AND APPARATUS FOR TRAINING MODEL, METHOD AND APPARATUS FOR SYNTHESIZING SPEECH, DEVICE AND STORAGE MEDIUM

(71) Applicant: BEIJING BAIDU NETCOM SCIENCE AND TECHNOLOGY CO., LTD., Beijing (CN)

(72) Inventors: Zhengkun Gao, Beijing (CN); Junteng Zhang, Beijing (CN); Wenfu Wang, Beijing (CN); Tao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 109 days.

(21) Appl. No.: 17/111,238

(22) Filed: Dec. 3, 2020

(65) Prior Publication Data
US 2021/0390943 A1  Dec. 16, 2021

(30) Foreign Application Priority Data

Jun. 15, 2020  (CN) .......................... 202010546704.4

(51) Int. Cl.
*G10L 13/00* (2006.01)
*G10L 13/047* (2013.01)
(Continued)

(52) U.S. Cl.
CPC ............ *G10L 13/047* (2013.01); *G10L 13/06* (2013.01); *G10L 13/10* (2013.01)

(58) Field of Classification Search
CPC ....... G10L 13/047; G10L 13/06; G10L 13/10; G10L 25/30; G10L 2013/105;
(Continued)

(56) References Cited

U.S. PATENT DOCUMENTS 7,136,816 B1  11/2006  Strom
10,475,438 B1 *  11/2019  Chicote ................... G10L 13/10
(Continued)

FOREIGN PATENT DOCUMENTS

CN       1604183 A  *  4/2005  ............ G10L 13/10
CN     101000764 A     7/2007
(Continued)

OTHER PUBLICATIONS

"Chen-Yu Yang et al, Unsupervised Prosodic Labeling of Speech Synthesis Databases Using Context-Dependent HMMs*, Jun. 2014, IEICE Transactions on Information and Systems, vol. E97-D, 1449-1460" (Year: 2014).*

(Continued)

*Primary Examiner* — Douglas Godbold
*Assistant Examiner* — Parker Mayfield
(74) *Attorney, Agent, or Firm* — Seed IP Law Group LLP

(57) ABSTRACT

The present disclosure discloses a method and apparatus for training a model, a method and apparatus for synthesizing a speech, a device and a storage medium, and relates to the field of natural language processing and deep learning technology. The method for training a model may include: determining a phoneme feature and a prosodic word boundary feature of sample text data; inserting a pause character into the phoneme feature according to the prosodic word boundary feature to obtain a combined feature of the sample text data; and training an initial speech synthesis model according to the combined feature of the sample text data, to obtain a target speech synthesis model.

14 Claims, 7 Drawing Sheets

(51) Int. Cl.
*G10L 13/06* (2013.01)
*G10L 13/10* (2013.01)
(58) Field of Classification Search
CPC ......... G10L 13/08; G10L 13/02; G10L 19/02; G10L 2013/083; G06N 3/0454; G06N 3/0472; G06N 3/088
See application file for complete search history.

(56) References Cited

U.S. PATENT DOCUMENTS

| | | | |
|---|---|---|---|
| 2007/0239439 A1 | 10/2007 | Yi et al. | |
| 2019/0122651 A1* | 4/2019 | Arik | G10L 13/027 |
| 2020/0380952 A1* | 12/2020 | Zhang | G10L 13/047 |

FOREIGN PATENT DOCUMENTS

| | | | | |
|---|---|---|---|---|
| CN | 101051458 | A | | 10/2007 |
| CN | 102194454 | A | | 9/2011 |
| CN | 102881282 | A | | 1/2013 |
| CN | 103971673 | A | | 8/2014 |
| CN | 105185373 | A | | 12/2015 |
| CN | 107039034 | A | | 8/2017 |
| CN | 109697973 | A | | 4/2019 |
| CN | 110534087 | A | | 12/2019 |
| CN | 110534089 | A | | 12/2019 |
| CN | 110534089 | A | * | 12/2019 |
| CN | 110782870 | A | | 2/2020 |
| JP | 8-508127 | A | | 8/1996 |
| JP | 2005-345846 | A | | 12/2005 |
| JP | 5754141 | B2 | | 7/2015 |
| JP | 2020-034883 | A | | 3/2020 |
| JP | 2020-060642 | A | | 4/2020 |
| KR | 100959494 | B1 | * | 5/2010 |
| WO | WO-2019056500 | A1 | * | 3/2019 ............. G10L 13/02 |

OTHER PUBLICATIONS

"Loitongbam Gyanendro Signh et al, Automatic Pause Marking for Speech Synthesis, Nov. 2017, Institute of Electrical and Electronics Engineers, TENCON 2017—2017 IEEE Region 10 Conference, 1790-1794" (Year: 2017).*

Van Santen JP. Assignment of segmental duration in text-to-speech synthesis. Computer Speech & Language. Apr. 1, 1994; 8 (2): 95-128. (Year: 1994).*

Extended European Search Report, dated Aug. 13, 2021, for European Patent Application No. 21162416.8. (11 pages).

Yang et al., "Unsupervised prosodic phrase boundary labeling of mandarin speech synthesis database using context-dependent HMM," ICASSP 2013, pp. 6875-6879.

Japanese Office Action for Japanese Application No. 2020-201661, dated Feb. 8, 2022, 3 pages.

* cited by examiner

METHOD AND APPARATUS FOR TRAINING MODEL, METHOD AND APPARATUS FOR SYNTHESIZING SPEECH, DEVICE AND STORAGE MEDIUM

CROSS-REFERENCE TO RELATED APPLICATIONS

This application claims priority to Chinese Application No. 202010546704.4, filed on Jun. 15, 2020 and entitled "Method and Apparatus for Training Model, Method and Apparatus for Synthesizing Speech, Device and Storage Medium," the entire disclosure of which is hereby incorporated by reference.

TECHNICAL FIELD

Embodiments of the present disclosure relates to the field of speech technology, specifically to the field of natural language processing and deep learning technology, and more specifically to a method and apparatus for training a model, a method and apparatus for synthesizing a speech, a device and a storage medium.

BACKGROUND

With the development of artificial intelligence technology, intelligent speech interaction is widely applied in various fields of work and life. For example, news to be broadcast by an anchorperson is synthesized through artificial intelligence (AI), and a speech message is broadcast through a smart speaker sound box.

Speech synthesis converts a text feature into a speech, and thus is the basis for the intelligent speech interaction. The fluency of the synthesized speech is the key to the effect of the intelligent speech interaction.

SUMMARY

Embodiments of the present disclosure provide a method and apparatus for training a model, a method and apparatus for synthesizing a speech, a device and a storage medium.

In a first aspect, an embodiment of the present disclosure provides a method for training a speech synthesis model, the method including: determining a phoneme feature and a prosodic word boundary feature of sample text data; inserting a pause character into the phoneme feature according to the prosodic word boundary feature to obtain a combined feature of the sample text data; and training an initial speech synthesis model according to the combined feature of the sample text data, to obtain a target speech synthesis model.

In a second aspect, an embodiment of the present disclosure provides a method for synthesizing a speech, the method including: determining a phoneme feature and a prosodic word boundary feature of target text data; inserting a pause character into the phoneme feature according to the prosodic word boundary feature to obtain a combined feature of the target text data; and obtaining, based on a target speech synthesis model, an acoustic feature according to the combined feature of the target text data, and synthesizing a target speech by using the acoustic feature.

In a third aspect, an embodiment of the present disclosure provides an apparatus for training a speech synthesis model, the apparatus including: a sample phoneme boundary module, configured to determine a phoneme feature and a prosodic word boundary feature of sample text data; a sample feature combining module, configured to insert a pause character into the phoneme feature according to the prosodic word boundary feature to obtain a combined feature of the sample text data; and a model training module, configured to train an initial speech synthesis model according to the combined feature of the sample text data, to obtain a target speech synthesis model.

In a fourth aspect, an embodiment of the present disclosure provides an apparatus for synthesizing a speech, the apparatus including: a target phoneme boundary module, configured to determine a phoneme feature and a prosodic word boundary feature of target text data; a target feature combining module, configured to insert a pause character into the phoneme feature according to the prosodic word boundary feature to obtain a combined feature of the target text data; and a speech synthesizing module, configured to, based on a target speech synthesis model, obtain an acoustic feature according to the combined feature of the target text data, and synthesize a target speech by using the acoustic feature.

In a fifth aspect, an embodiment of the present disclosure provides an electronic device, the device electronic including: at least one processor; and a memory, communicatively connected with the at least one processor, the memory storing instructions executable by the at least one processor, and the instructions, when executed by the at least one processor, causing the at least one processor to perform the method for training a speech synthesis model or the method for synthesizing a speech according to embodiments of the present disclosure.

In a sixth aspect, an embodiment of the present disclosure provides a non-transitory computer readable storage medium, storing computer instructions, the computer instructions being used to cause a computer to perform the method for training a speech synthesis model or the method for synthesizing a speech according to embodiments of the present disclosure.

According to the technical solutions in embodiments of the present disclosure, the fluency of the speech synthesis is improved.

It should be appreciated that the description of the Summary is not intended to limit the key or important features of embodiments of the present disclosure, or to limit the scope of embodiments of the present disclosure. Other features of the present disclosure will become readily comprehensible through the following description.

BRIEF DESCRIPTION OF THE DRAWINGS

The accompanying drawings are used to provide a better understanding for the scheme, and do not constitute a limitation to embodiments of the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

Figure 1A:
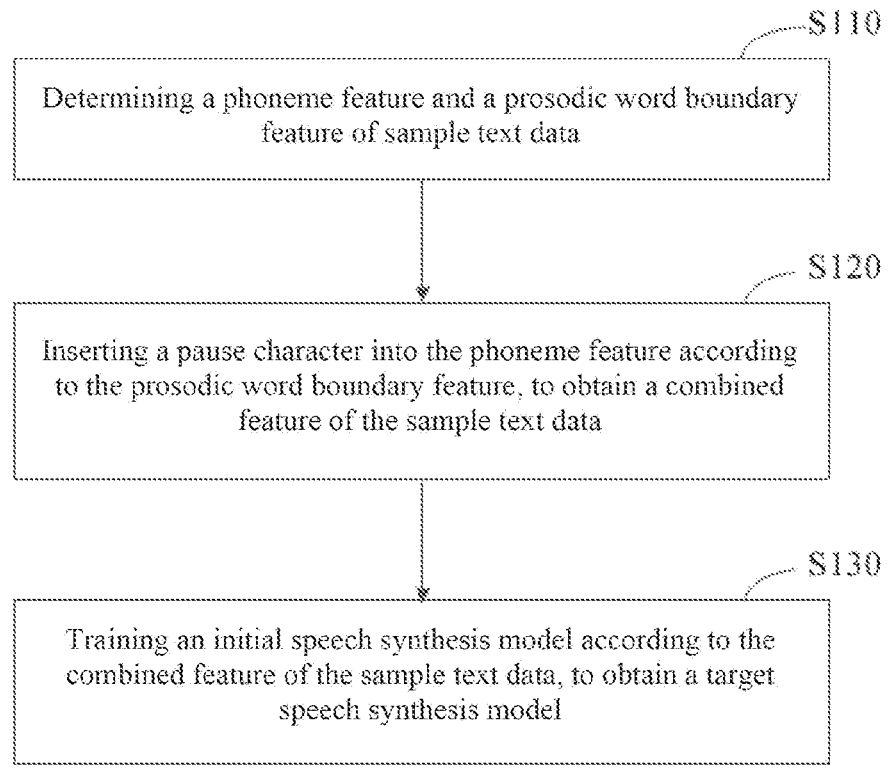
FIG. 1A is a schematic flowchart of a method for training a speech synthesis model according to an embodiment of the present disclosure.

FIG. 1A is a schematic flowchart of a method for training a speech synthesis model according to an embodiment of the present disclosure. This embodiment may be applicable to a situation where a speech synthesis model is trained. The method for training a speech synthesis model disclosed in this embodiment may be performed by an electronic device, and may be specifically performed by an apparatus for training a speech synthesis model. The apparatus may be implemented by means of software and/or hardware, and configured in the electronic device. Referring to FIG. 1A, the method for training a speech synthesis model according to this embodiment includes following steps.

S110, determining a phoneme feature and a prosodic word boundary feature of sample text data.

Here, a phoneme is the smallest phonetic unit divided according to a natural attribute of a speech, and is divided according to a pronouncing action in a syllable, and one action constitutes one phoneme. The phoneme is classified into vowel and consonant. The phoneme feature may refer to a phoneme sequence of the sample text data. Specifically, the pinyin of the sample text data is determined, and the pinyin is split according to a phoneme granularity to obtain the phoneme feature of the sample text data. Taking "san ge hao ren (three good people)" as an example, the phoneme feature may refer to s, an, g, e, h, ao, r, and en.

Figure 1B:
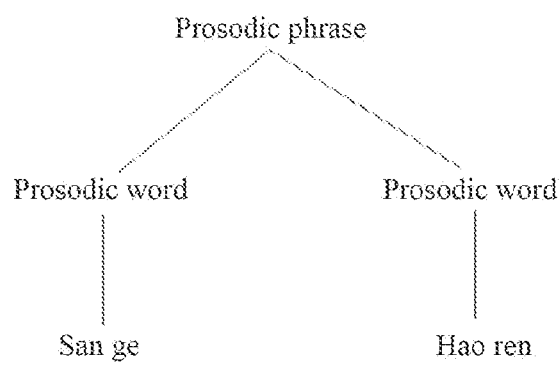
FIG. 1B is a schematic diagram of a prosodic word boundary according to an embodiment of the present disclosure.

Here, a syllable position at which a pause occurs in the text data is a prosodic word boundary, which may include at least one of prosodic word, prosodic phrase, or intonation phrase. Specifically, a prosodic word boundary prediction may be performed on the sample text data based on a pre-trained prosodic boundary detection model, to obtain the prosodic word boundary feature of the sample text data. Referring to FIG. 1B, still taking "san ge hao ren" as an example, the prosodic boundary feature may refer to the prosodic word "san ge," the prosodic word "hao ren," and the prosodic phrase "san ge hao ren." That is, at the pause position behind "ge," the prosodic boundary feature refers to the prosodic word, and at the pause position behind "ren," the prosodic boundary feature refers to the prosodic phrase.

S120, inserting a pause character into the phoneme feature according to the prosodic word boundary feature, to obtain a combined feature of the sample text data.

Here, the pause character is used to represent a pause between syllables. For different prosodic word boundary features, the pause character is the same. The combined feature of the sample text data is obtained by inserting a pause character associated with the prosodic word boundary feature as a special phoneme into the phoneme feature.

For example, the prosodic word and the prosodic phrase are associated with a pause character bk. The pause character bk is inserted into the phoneme feature s, an, g, e, h, ao, r and en, to obtain the combined feature s, an, g, e, bk, h, ao, r, en and bk.

S130, training an initial speech synthesis model according to the combined feature of the sample text data, to obtain a target speech synthesis model.

Here, the initial speech synthesis model may be a neural network-based speech synthesis model for outputting an acoustic feature. The neural network structure is not specifically limited in embodiments of the present disclosure. For example, the neural network structure is an acoustic spectrum prediction network. Specifically, the vector representation of the combined feature is determined, and the initial speech synthesis model is trained by using the vector representation of the combined feature as an input of the initial speech synthesis model.

The pause character for representing a prosodic word boundary is inserted into the phoneme feature, and the pause character is used as a special phoneme feature, such that not only the phoneme feature but also the prosodic word boundary feature is learned in the process of training the speech synthesis model, that is, prosodic information is integrated into the speech synthesis model, thus making the subsequently synthesized speech more fluent. In addition, since the combined feature refers to the feature of a phoneme granularity, the naturalness of the synthesized speech is improved through the processing of finer granularity in comparison with the speech synthesis of the word granularity and the phrase granularity, in the training process of the model. Moreover, the phoneme is a common feature of many types of languages such as Chinese and English. Therefore, the speech synthesis model based on the phoneme granularity has good performance not only when applied in a scenario of a single language such as Chinese or English, but also when applied in a scenario where many kinds of languages are mixed and used, for example, a scenario where Chinese and English are mixed.

In an alternative implementation, S120 includes: determining a prosodic word position in the phoneme feature according to the prosodic word boundary feature; and inserting the pause character at the prosodic word position to obtain the combined feature of the sample text data.

Since the accuracy of a prosodic word is higher than the accuracy of a prosodic phrase and the accuracy of an intonation phrase in the process of predicting a prosodic word boundary, and the pause position of the prosodic phrase and the pause position of the intonation phrase are also the pause positions of prosodic words, the degradation of the model performance caused by the low prediction accuracy of the prosodic phrase and the low prediction accuracy of the intonation phrase can be avoided by introducing a pause character for a prosodic word rather than a pause character for a prosodic phrase and a pause character for an intonation phrase into the combined feature, that is, by regarding a prosodic phrase and an intonation phrase as a prosodic word.

Alternatively, after the initial speech synthesis model is trained to obtain the target speech synthesis model, the method further includes: training an initial vocoder by using an output of the initial speech synthesis model and sample audio data, to obtain a target vocoder. The vocoder structure is not specifically limited in embodiments of the present disclosure. For example, the vocoder structure may be a RNN (cyclic neural network) vocoder. By training the speech synthesis model and the vocoder together, the robustness of the speech synthesis model and the robustness of the vocoder can be improved.

According to the technical solution of embodiments of the present disclosure, the combined feature is obtained by inserting the pause character for representing the prosodic word boundary feature into the phoneme feature, and the initial speech synthesis model is trained based on the combined feature of the sample text data, such that the target speech synthesis model contains the prosodic information, thus making the subsequently synthesized speech more fluent. Moreover, the speech synthesis model based on the phoneme granularity has a strong generality, and has good performance especially in the scenario where many kinds of languages are mixed and used.

Figure 2:
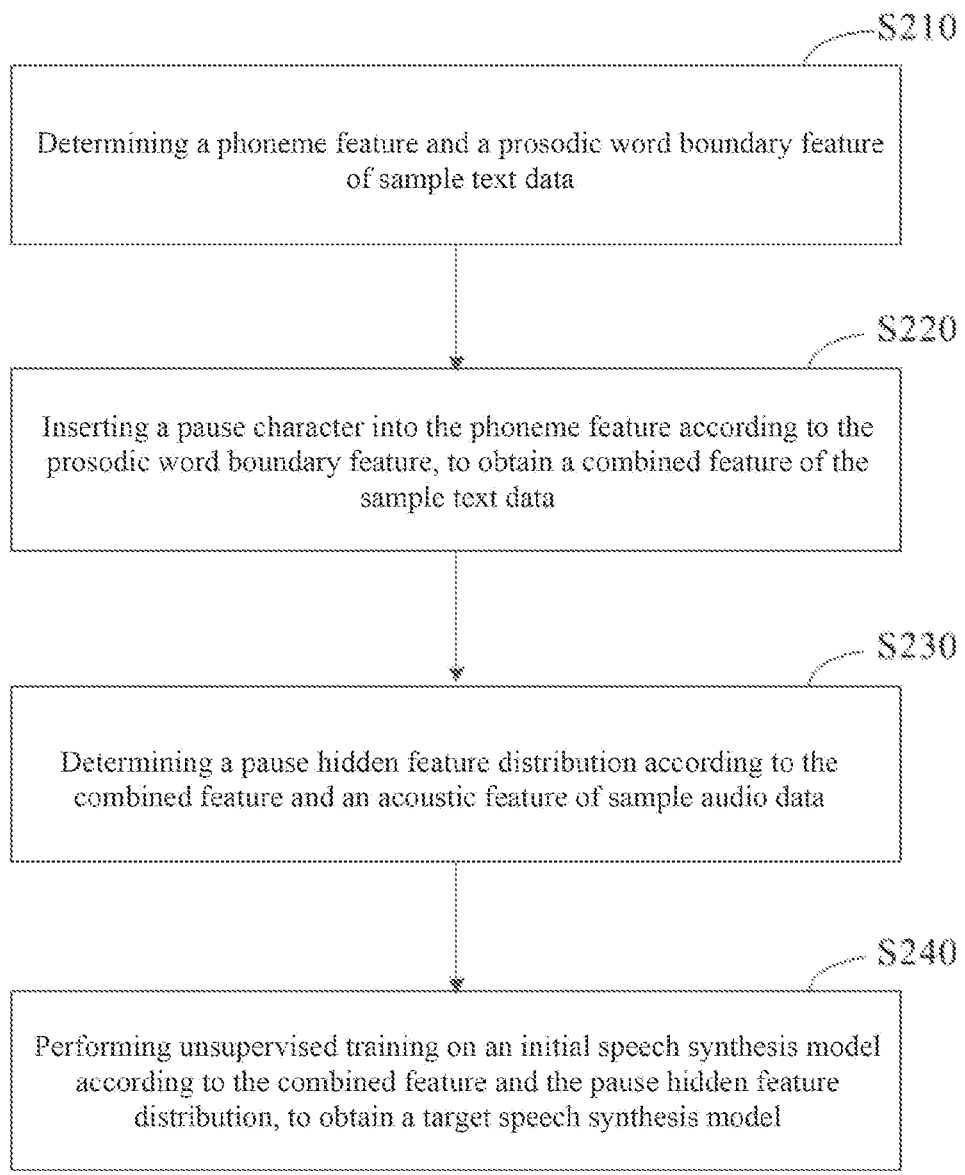
FIG. 2 is a schematic flowchart of a method for training a speech synthesis model according to an embodiment of the present disclosure.

FIG. 2 is a schematic flowchart of a method for training a speech synthesis model according to an embodiment of the present disclosure. This embodiment is an alternative scheme proposed on the basis of the above embodiment. Referring to FIG. 2, the method for training a speech synthesis model according to this embodiment includes following steps.

S210, determining a phoneme feature and a prosodic word boundary feature of sample text data.

S220, inserting a pause character into the phoneme feature according to the prosodic word boundary feature, to obtain a combined feature of the sample text data.

S230, determining a pause hidden feature distribution according to the combined feature and an acoustic feature of sample audio data.

Here, the sample audio data is associated with the sample text data, that is, the sample audio data is audio data of the sample text data, the fluency of which satisfies a requirement. The acoustic feature may refer to a Mel spectrum feature, an energy feature, etc. A hidden feature refers to an implicit feature that cannot be directly acquired, and the implicit feature is a concept opposite to an explicit feature that can be directly acquired. The pause hidden feature distribution may be a Gaussian distribution. For example, a pause is an explicit feature of a prosodic word boundary, and the pause at the prosodic word boundary can be directly obtained. However, a relationship between the prosodic word boundary and the acoustic feature cannot be directly acquired, and thus is an implicit feature of the prosodic word boundary.

Specifically, by processing the combined feature and the acoustic feature of the sample audio data, the acoustic feature of the phoneme and the acoustic feature of the pause character are obtained. It is assumed that the hidden feature of the pause character is subject to the Gaussian distribution, the pause hidden feature distribution is fitted according to the acoustic feature of the pause character.

In an alternative implementation, S230 includes: aligning the combined feature and the acoustic feature of the sample audio data to obtain an acoustic feature of the pause character in the combined feature; and processing the acoustic feature of the pause character through a variational auto-encoder to obtain the pause hidden feature distribution.

Here, the variational auto-encoder (VAE) maps the acoustic feature of the pause character to a posterior distribution. The posterior distribution may be a Gaussian distribution. Specifically, an audio frame associated with the phoneme and the pause character in the combined feature is determined through an alignment tool, to obtain the acoustic feature of the phoneme and the acoustic feature of the pause character. The acoustic feature of the pause character is processed through the variational auto-encoder to obtain the pause hidden feature distribution. Here, the alignment tool may include an encoding layer and an attention layer. The phoneme and the pause character in the combined feature are used as an input of the encoding layer, and a semantic vector outputted by the encoding layer and the acoustic feature of the sample audio data are used as an input of the attention layer, to obtain the acoustic feature of the phoneme and the acoustic feature of the pause character. By fitting the acoustic feature of each pause character in a sample, the relationship between an acoustic feature and a pause character (i.e., the pause hidden feature distribution) is obtained.

It should be noted that, since the alignment tool can obtain the audio frame associated with the pause character, a pause duration associated with the pause character can be obtained. The hidden feature of the pause character may be obtained according to the pause hidden feature distribution, and accordingly, an association relationship between the pause duration and the hidden feature may also be obtained, which is conductive to synthesizing, as required, the speeches of different pause durations according to the association relationship between the pause duration and the hidden feature at the subsequent using stage of the model.

S240, performing unsupervised training on an initial speech synthesis model according to the combined feature and the pause hidden feature distribution, to obtain a target speech synthesis model.

The initial speech synthesis model is trained in combination with the pause hidden feature distribution, such that the model can learn a pause hidden feature, which improves the performance of the model, thereby improving the quality of the synthesized speech. Moreover, the pause hidden feature distribution is obtained through the variational auto-encoder, such that the speech synthesis model can learn the hidden features of pause characters of different pause durations, thereby supporting that audios of different pause durations are synthesized as required in the speech synthesis process.

In an alternative implementation, S240 includes: determining a combined feature vector representation according to the combined feature; performing sampling on the pause hidden feature distribution to obtain a pause hidden feature; using the combined feature vector representation as an input of a decoder in the initial speech synthesis model, and concatenating an output of the decoder and the pause hidden feature to obtain a context vector; and encoding the context vector through an encoder in the initial speech synthesis model to obtain an acoustic feature outputted by the initial speech synthesis model.

Specifically, a first association relationship between a candidate phoneme feature and a vector representation and a second association relationship between a pause character and a vector representation may be pre-constructed. For example, the vector representation of the phoneme feature and the vector representation of the pause character may be vector representations of a fixed length, the vector representations of different candidate phoneme features are different, and the vector representations of different pause characters are different. The combined feature vector representation is obtained by matching the phoneme feature and the pause character in the combined feature with the first association relationship and the second association relationship.

The combined feature vector representation is used as the input of the decoder in the initial speech synthesis model, and the output of the decoder and the pause hidden feature are concatenated to obtain a final output of the decoder. Encoding is performed according to the final output of the decoder, to obtain the acoustic features of the phoneme and the pause character in the combined feature. By concatenating the pause hidden feature and the output of the decoder, the speech synthesis model can learn the pause hidden feature in the training process. The model does not rely on manual annotations through the unsupervised training, thereby further improving the efficiency and accuracy of the training for the model.

In addition, the initial vocoder is trained according to the acoustic features of the phoneme and the pause character that are outputted by the initial speech synthesis model during training and the sample audio data, to obtain the target vocoder.

According to the technical solution of embodiments of the present disclosure, the pause hidden feature is introduced to train the initial speech synthesis model, such that the model can learn the pause hidden feature, which improves the performance of the model, thereby improving the quality of synthesized speech. Moreover, the pause hidden feature distribution is obtained through the variational auto-encoder, such that the speech synthesis model can learn the hidden features of the pause characters of different pause durations, thereby supporting that audios of different pause durations are synthesized as required in the speech synthesis process.

Figure 3:
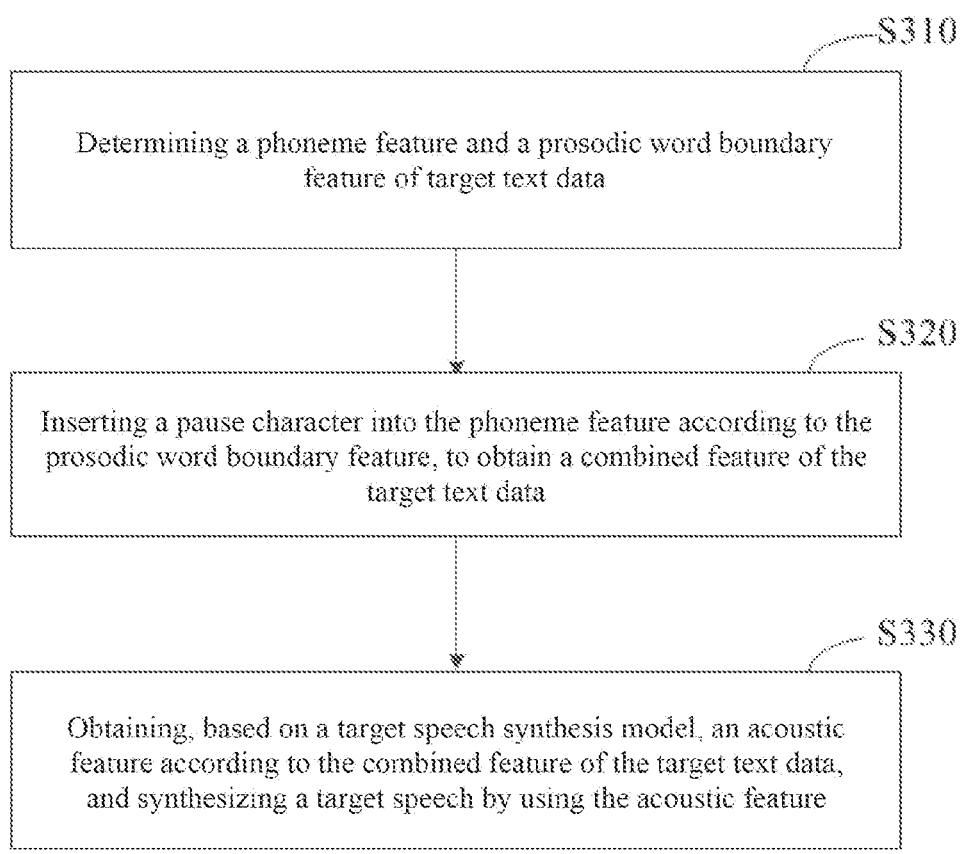
FIG. 3 is a schematic flowchart of a method for synthesizing a speech provided according to an embodiment of the present disclosure.

FIG. 3 is a schematic flowchart of a method for synthesizing a speech according to an embodiment of the present disclosure. This embodiment may be applicable to a situation where a speech is synthesized. The method for synthesizing a speech disclosed in this embodiment may be performed by an electronic device, and may be specifically performed by an apparatus for synthesizing a speech. The apparatus may be implemented by means of software and/or hardware, and configured in the electronic device. Referring to FIG. 3, the method for synthesizing a speech according to this embodiment includes following steps.

S310, determining a phoneme feature and a prosodic word boundary feature of target text data.

Here, the target text data is text data of a to-be-synthesized speech. Specifically, the pinyin of the target text data is determined, and the pinyin is split according to a phoneme granularity to obtain the phoneme feature of the target text data. A syllable position at which a pause occurs in the text data is a prosodic word boundary, and the prosodic word boundary feature may include at least one of prosodic word, prosodic phrase, or intonation phrase. Specifically, a prosodic word boundary prediction may be performed on the target text data based on a pre-trained prosodic boundary detection model, to obtain the prosodic word boundary feature of the target text data.

S320, inserting a pause character into the phoneme feature according to the prosodic word boundary feature, to obtain a combined feature of the target text data.

Here, the pause character is used to represent a pause between syllables. For different prosodic word boundary features, the pause characters may be different. The combined feature of the target text data is obtained by inserting a pause character associated with the prosodic word boundary feature as a special phoneme into the phoneme feature.

In an alternative implementation, S320 includes: determining a prosodic word position in the phoneme feature according to the prosodic word boundary feature; and inserting the pause character at the prosodic word position to obtain the combined feature of the target text data.

A mistake in learning for the prosodic boundary feature in the model training process that is caused by the inaccurate prediction for the prosodic phrase and the intonation phrase can be avoided by introducing a pause character for a prosodic word rather than a pause character for a prosodic phrase and a pause character for an intonation phrase into the combined feature, thus improving the accuracy of the speech synthesis model.

S330, obtaining, based on a target speech synthesis model, an acoustic feature according to the combined feature of the target text data, and synthesizing a target speech by using the acoustic feature.

Specifically, the combined feature of the target text data is used as an input of the target speech synthesis model to obtain acoustic features of the phoneme and the pause character in the combined feature outputted by the target speech synthesis model. The acoustic features of the target text data are used as an input of a vocoder, to obtain the target speech synthesized by the vocoder.

According to the technical solution of embodiments of the present disclosure, the pause character for representing the prosodic word boundary feature is inserted into the phoneme feature to obtain the combined feature, the combined feature of the target text data is processed based on the target speech synthesis model to obtain the acoustic feature of the target text data, and the target speech is synthesized according to the acoustic feature of the target text data, thereby improving the fluency of the target speech. Moreover, the speech synthesis model based on the phoneme granularity has a strong generality, and has good performance especially in the scenario where many kinds of languages are mixed and used.

Figure 4:
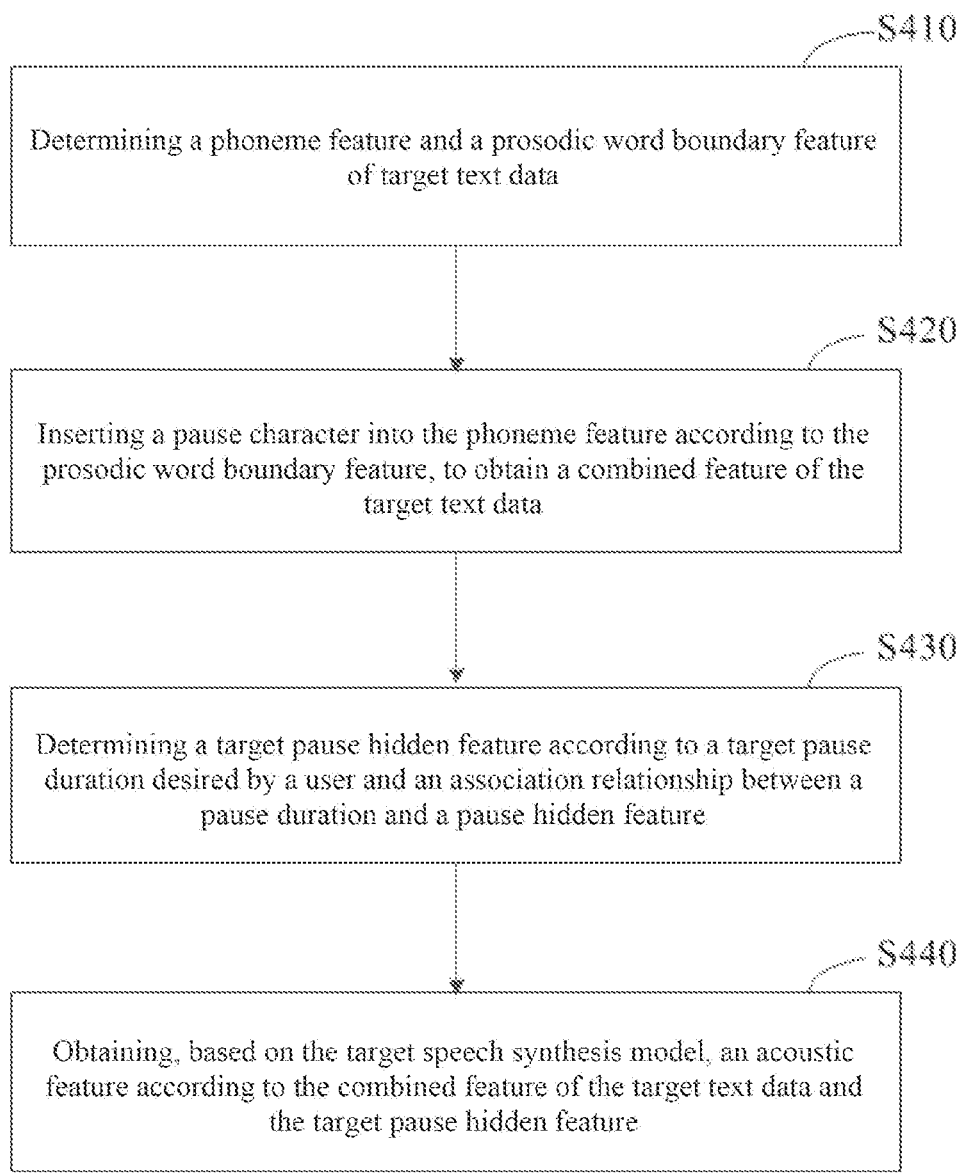
FIG. 4 is a schematic flowchart of a method for synthesizing a speech according to an embodiment of the present disclosure.

FIG. 4 is a schematic flowchart of a method for synthesizing a speech according to an embodiment of the present disclosure. This embodiment is an alternative scheme proposed on the basis of the above embodiment. Referring to FIG. 4, the method for synthesizing a speech according to this embodiment includes following steps.

S410, determining a phoneme feature and a prosodic word boundary feature of target text data.

S420, inserting a pause character into the phoneme feature according to the prosodic word boundary feature, to obtain a combined feature of the target text data.

S430, determining a target pause hidden feature according to a target pause duration desired by a user and an association relationship between a pause duration and a pause hidden feature.

Here, the association relationship between the pause duration and the pause hidden feature is obtained at the training stage of the target speech synthesis model, and may include an association relationship between at least two known pause durations and known pause hidden features. The target pause duration refers to a pause length required by the user for the target speech, and may be a specific duration value directly inputted by the user, or may be determined according to a pause level selected by the user.

Specifically, if the target pause duration is any known pause duration, the known pause hidden feature associated with the known pause duration may be directly used as the target pause hidden feature. If the known pause durations do not include the target pause duration, interpolation may be performed on the known pause hidden feature according to a numerical relationship between the target pause duration and the known pause duration, to obtain the target pause hidden feature. Since the target speech synthesis model learns the pause hidden feature at the training stage, and the association relationship between the pause duration and the pause hidden feature is constructed, it is possible to support the user in synthesizing speeches of different pause durations as required.

S440, obtaining, based on the target speech synthesis model, an acoustic feature according to the combined feature of the target text data and the target pause hidden feature.

Specifically, a combined feature vector representation of the target text data is determined. The combined feature vector representation is used as an input of a decoder in the target speech synthesis model, and an output of the decoder and the target pause hidden feature are concatenated to be used as a final output of the decoder. The final output of the decoder is used as an input of an attention layer in the target speech synthesis model, and processed by an encoder in the target speech synthesis model to obtain the acoustic feature of the target text data. The acoustic feature of the target text data is used as input of a vocoder, to obtain target speech.

According to the technical solution of embodiments of the present disclosure, the target pause hidden feature is determined according to the target pause duration desired by the user and the association relationship between the pause duration and the pause hidden feature that is constructed by the speech synthesis model at the training stage, and the target speech is synthesized according to the combined feature of the target text data and the target pause hidden feature, and thus it is implemented that the speeches of different pause durations are synthesized as required by the user.

Figure 5:
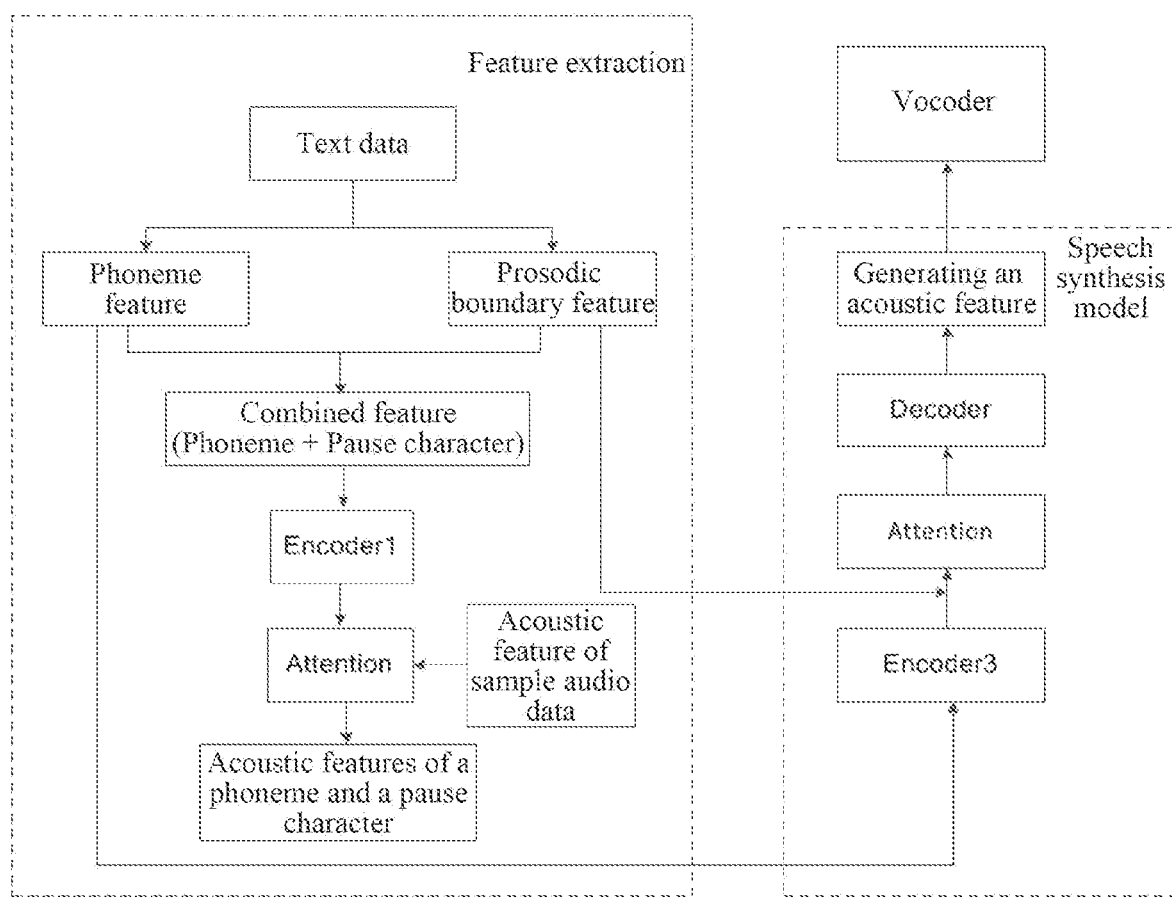
FIG. 5 is a schematic flowchart of a method for processing speech synthesis according to an embodiment of the present disclosure.

FIG. 5 is a schematic flowchart of a method for processing a speech synthesis according to an embodiment of the present disclosure. Referring to FIG. 5, a method for processing a speech synthesis model according to an embodiment of the present disclosure includes a training stage of a speech synthesis model and a using stage of the speech synthesis model, that is, a method for synthesizing a speech.

Feature extraction is performed on sample text data at the training stage of the speech synthesis model, and feature extraction is performed on target text data at the using stage. Specifically, the phoneme feature and the prosodic word boundary feature of the text data are respectively determined through a front-end analysis. A prosodic word position is determined according to the prosodic word boundary feature, and a pause character is inserted at the prosodic word position of the phoneme feature, to obtain a combined feature. As an example, the text data is "san ge hao ren," and the pause character of the prosodic word is bk. Accordingly, the combined feature refers to s, an, g, e, bk, h, ao, r, en and bk.

At the training stage of the model, a combined feature representation of the sample text data is used as an input of a first decoder encoder1, and an output of encoder1 and a spectrum feature of sample audio data associated with the sample text data are used as an input of an attention layer, to obtain spectrum features of phonemes and pause characters in the combined feature. All the spectrum features of the pause characters in the sample text data are respectively used as an input of a variational auto-encoder encoder2, to obtain the pause hidden feature distribution. Specifically, assuming that the pause hidden feature distribution of the pause character conforms to the Gaussian distribution, the pause hidden feature distribution is fitted according to the spectrum of the pause character. Sampling is performed on the pause hidden feature distribution to obtain a hidden feature. The combined feature representation of the sample text data is used as an input of a decoder encoder3 in the speech synthesis model, and an output of encoder3 and the sampled hidden feature are concatenated to be used as a final output of encoder3. An acoustic feature is obtained via the encoder and the attention layer, and sampling is performed on the acoustic feature outputted by the speech synthesis model to train a vocoder.

In addition, since an audio frame associated with the pause character can be obtained by aligning the sample text data and the acoustic feature of the sample audio data, the pause duration associated with the pause character can be obtained. According to the pause hidden feature distribution, the hidden feature of the pause character may be obtained, and accordingly, an association relationship between the pause duration and the hidden feature may also be obtained, which is conductive to synthesizing, as required, the speeches of different pause durations according to the association relationship between the pause duration and the hidden feature at the subsequent using stage of the model.

At a speech synthesis stage, a target pause duration desired by a user is acquired, and a target pause hidden feature associated with the target pause duration is determined according to the association relationship between the pause duration and the pause hidden feature. The combined feature of the to-be-synthesized target text data is used as an input of the decoder encoder3 in the speech synthesis model, and an output of encoder3 and a target hidden feature are concatenated to be used as a final output of encoder3. An acoustic feature is obtained via the attention layer and the encoder, and the acoustic feature outputted by the speech synthesis model is inputted into the vocoder to obtain the target speech.

According to the above technical solution, the pause character for representing the prosodic word boundary feature is inserted into the phoneme feature to obtain the combined feature, which improves the fluency of the target speech. Moreover, the speech synthesis model based on the phoneme granularity has a strong generality, and has good performance especially in a scenario where many kinds of languages are mixed and used. The pause hidden feature is introduced to train an initial speech synthesis model, such that the model can learn the pause hidden feature, which improves the performance of the model, thereby improving the quality of the synthesized speech. Moreover, audios of different pause durations are synthesized as required in the speech synthesis process.

Figure 6:
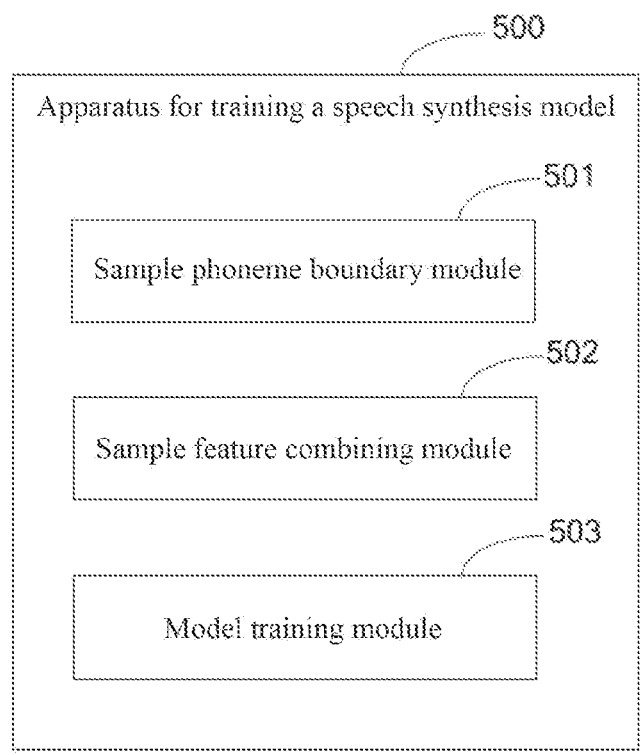
FIG. 6 is a schematic structural diagram of an apparatus for training a speech synthesis model according to an embodiment of the present disclosure.

FIG. 6 is a schematic structural diagram of an apparatus for training a speech synthesis model according to an embodiment of the present disclosure. Referring to FIG. 6, embodiments of the present disclosure discloses an apparatus 500 for training a speech synthesis model, and the apparatus 500 includes: a sample phoneme boundary module 501, configured to determine a phoneme feature and a prosodic word boundary feature of sample text data; a sample feature combining module 502, configured to insert a pause character into the phoneme feature according to the prosodic word boundary feature to obtain a combined feature of the sample text data; and a model training module 503, configured to train an initial speech synthesis model according to the combined feature of the sample text data, to obtain a target speech synthesis model.

Alternatively, the sample feature combining module 502 includes: a sample prosodic word position unit, configured to determine a prosodic word position in the phoneme feature according to the prosodic word boundary feature;

and a sample pause character inserting unit, configured to insert the pause character at the prosodic word position to obtain the combined feature of the sample text data.

Alternatively, the model training module 503 includes: a hidden feature distribution unit, configured to determine a pause hidden feature distribution according to the combined feature and an acoustic feature of sample audio data, the sample audio data being associated with the sample text data; and a model training unit, configured to perform unsupervised training on the initial speech synthesis model according to the combined feature and the pause hidden feature distribution.

Alternatively, the hidden feature distribution unit includes: an acoustic feature subunit, configured to align the combined feature and the acoustic feature of the sample audio data to obtain an acoustic feature of the pause character in the combined feature; and a hidden feature distribution subunit, configured to process the acoustic feature of the pause character through a variational auto-encoder to obtain the pause hidden feature distribution.

Alternatively, the model training unit includes: a feature representation subunit, configured to determine a combined feature vector representation according to the combined feature; a hidden feature sampling subunit, configured to perform sampling on the pause hidden feature distribution to obtain a pause hidden feature; a decoding subunit, configured to use the combined feature vector representation as an input of a decoder in the initial speech synthesis model, and concatenate an output of the decoder and the pause hidden feature to obtain a context vector; and an encoding subunit, configured to encode the context vector through an encoder in the initial speech synthesis model to obtain an acoustic feature outputted by the initial speech synthesis model.

Alternatively, the apparatus further includes a vocoder module, configured to: train an initial vocoder by using an output of the initial speech synthesis model and the sample audio data, to obtain a target vocoder.

According to the technical solution of embodiments of the present disclosure, the pause hidden feature is introduced to train the initial speech synthesis model, such that the model can learn the pause hidden feature, which improves the performance of the model, thereby improving the quality of synthesized speech. Moreover, the pause hidden feature distribution is obtained through the variational auto-encoder, such that the speech synthesis model can learn the hidden features of the pause characters of different pause durations, thereby supporting that audios of different pause durations are synthesized as required in the speech synthesis process.

Figure 7:
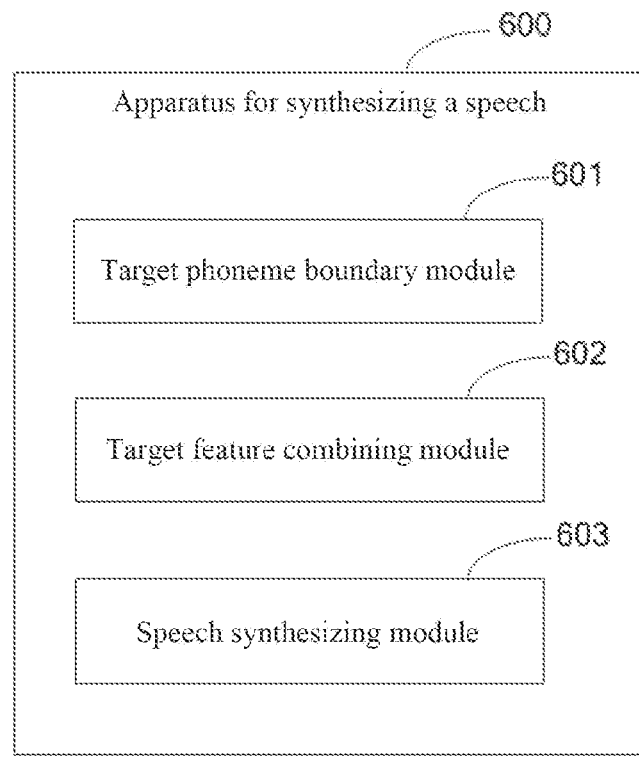
FIG. 7 is a schematic structural diagram of an apparatus for synthesizing a speech according to an embodiment of the present disclosure.

FIG. 7 is a schematic structural diagram of an apparatus for synthesizing a speech according to an embodiment of the present disclosure. Referring to FIG. 7, embodiments of the present disclosure discloses an apparatus 600 for synthesizing a speech, and the apparatus 600 includes: a target phoneme boundary module 601, configured to determine a phoneme feature and a prosodic word boundary feature of target text data; a target feature combining module 602, configured to insert a pause character into the phoneme feature according to the prosodic word boundary feature to obtain a combined feature of the target text data; and a speech synthesizing module 603, configured to, based on a target speech synthesis model, obtain an acoustic feature according to the combined feature of the target text data, and synthesize a target speech by using the acoustic feature.

Alternatively, the target feature combining module 602 includes: a target prosodic word position unit, configured to determine a prosodic word position in the phoneme feature according to the prosodic word boundary feature; and a target pause character inserting unit, configured to insert the pause character at the prosodic word position to obtain the combined feature of the target text data.

Alternatively, the speech synthesizing module 603 includes: a hidden feature determining unit, configured to determine a target pause hidden feature according to a target pause duration desired by a user and an association relationship between a pause duration and a pause hidden feature, the association relationship being obtained at a training stage of the target speech synthesis model; and a speech synthesizing unit, configured to, based on the target speech synthesis model, obtain the acoustic feature according to the combined feature of the target text data and the target pause hidden feature.

According to the technical solution of embodiments of the present disclosure, the pause character for representing the prosodic word boundary feature is inserted into the phoneme feature to obtain the combined feature, which improves the fluency of the target speech. Moreover, the speech synthesis model based on the phoneme granularity has a strong generality, and has good performance especially in a scenario where many kinds of languages are mixed and used. In addition, the speeches of different pause durations can be synthesized as required by the user.

According to embodiments of the present disclosure, the present disclosure further provides an electronic device and a readable storage medium.

Figure 8:
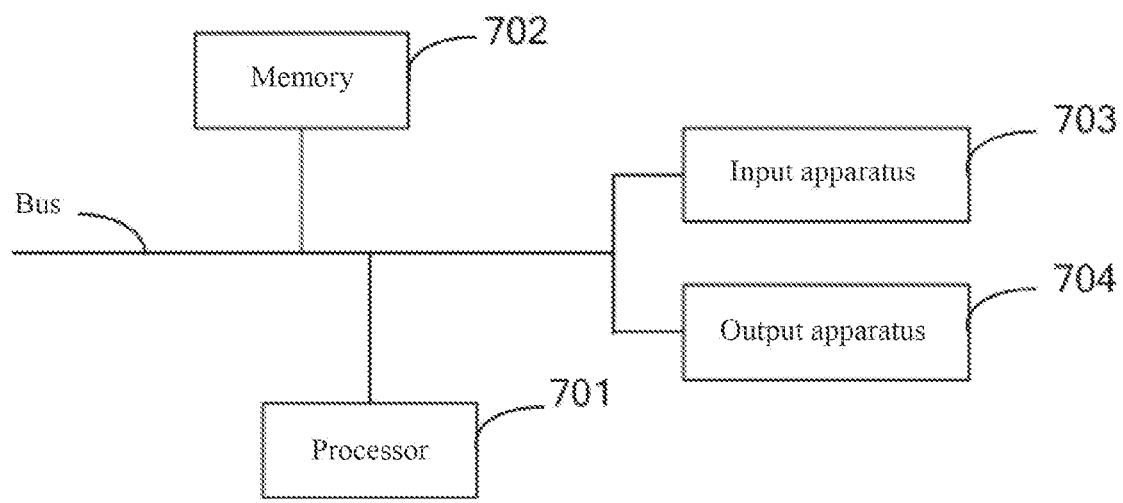
FIG. 8 is a block diagram of an electronic device used to implement the method for training a speech synthesis model or the method for synthesizing a speech according to embodiments of the present disclosure.

As shown in FIG. 8, FIG. 8 is a block diagram of an electronic device of the method for training a speech synthesis model or the method for synthesizing a speech according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as a personal digital processor, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 8, the electronic device includes one or more processors 701, a memory 702, and an interface for connecting parts, the interface including a high speed interface and a low speed interface. The parts are interconnected using different buses, and may be mounted on a common motherboard or in other ways as needed. The processors may process an instruction executed within the electronic device, the instruction including an instruction stored in the memory or on the memory to display a graphical feature of a GUI on an external input/output apparatus such as a display device coupled to the interface. In other implementations, a plurality of processors and/or a plurality of buses may be used, if desired, along with a plurality of memories. Also, a plurality of electronic devices may be connected, and each device provides a portion of necessary operations (e.g., as a server array, a group of blade servers or a multi-processor system). In FIG. 8, one processor 701 is taken as an example.

The memory 702 is a non-transitory computer readable storage medium according to an embodiment of the present disclosure. Here, the memory stores instructions executable by at least one processor, to cause the at least one processor to perform a method for training a speech synthesis model or the method for synthesizing a speech according to embodiments of the present disclosure. The non-transitory computer readable storage medium in embodiments of the present disclosure stores computer instructions, the computer instructions being used to cause a computer to perform the method for training a speech synthesis model or the method for synthesizing a speech according to embodiments of the present disclosure.

As the non-transitory computer readable storage medium, the memory 702 may be used to store a non-transitory software program, a non-transitory computer executable program and a module such as a program instruction/module (as an example, the sample phoneme boundary module 501, the sample feature combining module 502 and the model training module 503 shown in FIG. 6; as another example, the target phoneme boundary module 601, the target feature combining module 602 and the speech synthesizing module 603 shown in FIG. 7) corresponding to the method for training a speech synthesis model or the method for synthesizing a speech according to embodiments of the present disclosure. The processor 701 executes various functional applications and data processing of the server by running the non-transitory software program, the instruction and the module stored in the memory 702, i.e., implements the method for training a speech synthesis model or the method for synthesizing a speech according to embodiments of the methods.

The memory 702 may include a storage program area and a storage data area. Here, the storage program area may store an operating system and an application program required for at least one function. The storage data area may store data, etc. created according to the use of an electronic device for training a speech synthesis model or synthesizing a speech. In addition, the memory 702 may include a high speed random access memory, and may also include a non-transitory memory, for example, at least one magnetic disk storage device, a flash storage device, or other non-transitory solid state storage devices. In some embodiments, the memory 702 may alternatively include a memory disposed remotely relative to the processor 701. The remote memory may be connected to the electronic device for training a speech synthesis model or synthesizing a speech, via a network. Examples of such network include, but not limited to, the Internet, an enterprise intranet, a local area network, a mobile communication network, and a combination thereof.

The electronic device for training a speech synthesis model or synthesizing a speech may further include: an input apparatus 703 and an output apparatus 704. The processor 701, the memory 702, the input apparatus 703 and the output apparatus 704 may be connected via a bus or in other ways. In FIG. 8, the connection via a bus is taken as an example.

The input apparatus 703 may receive an inputted number or inputted character feature, and generate a key signal input related to the user setting and functional control of the electronic device for training a speech synthesis model or synthesizing a speech. For example, the input apparatus is a touch screen, a keypad, a mouse, a track pad, a touch pad, a pointing stick, one or more mouse buttons, a track ball, a joystick, or the like. The output apparatus 704 may include a display device, an auxiliary lighting apparatus (e.g., an LED), a tactile feedback apparatus (e.g., a vibration motor), etc. The display device may include, but not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computers and having a client-server relationship to each other. The server may be a cloud server, also known as a cloud computing server or a cloud host, which is a host product in a cloud computing service system, and solves the defects that the management is difficult and the transaction scalability is weak in traditional physical hosts and VPS services.

According to the technical solutions of embodiments of the present disclosure, a pause character for representing a prosodic word boundary feature is inserted into a phoneme feature to obtain a combined feature, which improves the fluency of target speech. Moreover, a speech synthesis model based on a phoneme granularity has a strong generality, and has good performance especially in a scenario where many kinds of languages are mixed and used. A pause hidden feature is introduced to train an initial speech synthesis model, such that the model can learn the pause hidden feature, which improves the performance of the model, thereby improving the quality of synthesized speech. Moreover, audios of different pause durations are synthesized as required in the speech synthesis process.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for training a speech synthesis model, comprising:
   determining a phoneme feature and a prosodic word boundary feature of sample text data;
   inserting a pause character into the phoneme feature according to the prosodic word boundary feature to obtain a combined feature of the sample text data; and
   training an initial speech synthesis model according to the combined feature of the sample text data, to obtain a target speech synthesis model, wherein the training the initial speech synthesis model according to the combined feature of the sample text data comprises:
   determining a pause hidden feature distribution according to the combined feature and an acoustic feature of sample audio data, the sample audio data being associated with the sample text data; and
   performing unsupervised training on the initial speech synthesis model according to the combined feature and the pause hidden feature distribution, wherein the performing unsupervised training on the initial speech synthesis model according to the combined feature and the pause hidden feature distribution comprises:
   determining a combined feature vector representation according to the combined feature;
   obtaining an output of a first encoder by using the combined feature representation as an input of the first encoder;
   obtaining spectrum features of phonemes and pause characters in the combined feature, by using an output of the first encoder and a spectrum feature of the sample audio data associated with the sample text data as an input of a first attention layer;
   obtaining the muse hidden feature distribution b using spectrum features of the pause characters in the combined feature as an input of a second encoder;
   performing sampling on the pause hidden feature distribution to obtain a hidden feature;
   obtaining an out nit of a third encoder b using the combined feature representation as an input of the third encoder;
   obtaining a final output of the third encoder by concatenating the output of the third encoder and the hidden feature; and
   obtaining an acoustic feature based on the final output of the third encoder.

2. The method according to claim 1, wherein the inserting the pause character into the phoneme feature according to the prosodic word boundary feature to obtain the combined feature of the sample text data comprises:
   determining a prosodic word position in the phoneme feature according to the prosodic word boundary feature; and
   inserting the pause character at the prosodic word position to obtain the combined feature of the sample text data.

3. The method according to claim 1, wherein the determining the pause hidden feature distribution according to the combined feature and the acoustic feature of sample audio data comprises:
   aligning the combined feature and the acoustic feature of the sample audio data to obtain an acoustic feature of the pause character in the combined feature; and
   processing the acoustic feature of the pause character through a variational auto-encoder to obtain the pause hidden feature distribution.

4. The method according to claim 1, further comprising:
   training an initial vocoder by using an output of the initial speech synthesis model and the sample audio data, to obtain a target vocoder.

5. The method according to claim 1, wherein the performing unsupervised training on the initial speech synthesis model according to the combined feature and the pause hidden feature distribution comprises:
   determining a combined feature vector representation according to the combined feature, wherein the determining the combined feature vector representation according to the combined feature comprises: pre-constructing a first association relationship between a candidate phoneme feature and a vector representation, and a second association relationship between the pause character and a vector representation, and matching the phoneme feature and the pause character in the combined feature with the first association relationship and the second association relationship, to obtain the combined feature vector representation;
   performing sampling on the pause hidden feature distribution to obtain a pause hidden feature;
   using the combined feature vector representation as an input of a decoder in the initial speech synthesis model, and concatenating an output of the decoder and the pause hidden feature to obtain a context vector; and
   encoding the context vector through an encoder in the initial speech synthesis model to obtain an acoustic feature outputted by the initial speech synthesis mode.

6. The method according to claim 1, wherein the method further comprises:
   determining a target phoneme feature and a target prosodic word boundary feature of target text data;

inserting a target pause character into the target phoneme feature according to the target prosodic word boundary feature to obtain a combined feature of the target text data;

determining a target pause hidden feature according to a target pause duration desired by a user and an association relationship between a known pause duration and a known pause hidden feature, the association relationship being obtained at a training stage of the target speech synthesis model, wherein the target pause hidden feature is obtained by performing an interpolation on the known pause hidden feature according to a numerical relationship between the target pause duration and the known pause duration; and obtaining, based on the target speech synthesis model, a target acoustic feature according to the combined feature of the target text data and the target pause hidden feature.

7. The method according to claim 6, wherein the inserting the target pause character into the target phoneme feature according to the target prosodic word boundary feature to obtain the combined feature of the target text data comprises:

determining a prosodic word position in the target phoneme feature according to the target prosodic word boundary feature; and inserting the target pause character at the prosodic word position to obtain the combined feature of the target text data.

8. An electronic device, comprising:
one or more processors; and
one or more memories, communicatively connected with the one or more processors,
the one or more memories collectively storing instructions executable by the one or more processors, and the instructions, when collectively executed by the one or more processors, causing the one or more processors to perform operations, the operations comprising:
determining a phoneme feature and a prosodic word boundary feature of sample text data;
inserting a pause character into the phoneme feature according to the prosodic word boundary feature to obtain a combined feature of the sample text data; and
training an initial speech synthesis model according to the combined feature of the sample text data, to obtain a target speech synthesis model, wherein the training the initial speech synthesis model according to the combined feature of the sample text data comprises:
determining a pause hidden feature distribution according to the combined feature and an acoustic feature of sample audio data, the sample audio data being associated with the sample text data; and
performing unsupervised training on the initial speech synthesis model according to the combined feature and the pause hidden feature distribution, wherein the performing unsupervised training on the initial speech synthesis model according to the combined feature and the pause hidden feature distribution comprises:
determining a combined feature vector representation according to the combined feature;
obtaining an output of a first encoder by using the combined feature representation as an input of the first encoder;
obtaining spectrum features of phonemes and pause characters in the combined feature, by using an output of the first encoder and a spectrum feature of the sample audio data associated with the sample text data as an input of a first attention layer;

obtaining the pause hidden feature distribution by using spectrum features of the pause characters in the combined feature as an input of a second encoder;

performing sampling on the pause hidden feature distribution to obtain a hidden feature;

obtaining an output of a third encoder by using the combined feature representation as an input of the third encoder;

obtaining a final output of the third encoder by concatenating the output of the third encoder and the hidden feature; and obtaining an acoustic feature based on the final output of the third encoder.

9. The electronic device according to claim 8, wherein the inserting the pause character into the phoneme feature according to the prosodic word boundary feature to obtain the combined feature of the sample text data comprises:

determining a prosodic word position in the phoneme feature according to the prosodic word boundary feature; and inserting the pause character at the prosodic word position to obtain the combined feature of the sample text data.

10. The electronic device according to claim 8, wherein the determining the pause hidden feature distribution according to the combined feature and the acoustic feature of sample audio data comprises:

aligning the combined feature and the acoustic feature of the sample audio data to obtain an acoustic feature of the pause character in the combined feature; and processing the acoustic feature of the pause character through a variational auto-encoder to obtain the pause hidden feature distribution.

11. The electronic device according to claim 8, the operations further comprising:

training an initial vocoder by using an output of the initial speech synthesis model and the sample audio data, to obtain a target vocoder.

12. The electronic device according to claim 8, the operations further comprising:

determining a target phoneme feature and a target prosodic word boundary feature of target text data;

inserting a target pause character into the target phoneme feature according to the target prosodic word boundary feature to obtain a combined feature of the target text data;

determining a target pause hidden feature according to a target pause duration desired by a user and an association relationship between a known pause duration and a known pause hidden feature, the association relationship being obtained at a training stage of the target speech synthesis model, wherein the target pause hidden feature is obtained by performing an interpolation on the known pause hidden feature according to a numerical relationship between the target pause duration and the known pause duration; and obtaining, based on the target speech synthesis model, a target acoustic feature according to the combined feature of the target text data and the target pause hidden feature.

13. The electronic device according to claim 12, wherein the inserting the target pause character into the target phoneme feature according to the target prosodic word boundary feature to obtain the combined feature of the target text data comprises:

determining a prosodic word position in the target phoneme feature according to the target prosodic word boundary feature; and inserting the target pause character at the prosodic word position to obtain the combined feature of the target text data.

14. A non-transitory computer readable storage medium, storing computer instructions, the computer instructions being used to cause a computer to perform operations, the operations comprising:

determining a phoneme feature and a prosodic word boundary feature of sample text data;

inserting a pause character into the phoneme feature according to the prosodic word boundary feature to obtain a combined feature of the sample text data; and training an initial speech synthesis model according to the combined feature of the sample text data, to obtain a target speech synthesis model, wherein the training the initial speech synthesis model according to the combined feature of the sample text data comprises:

determining a pause hidden feature distribution according to the combined feature and an acoustic feature of sample audio data, the sample audio data being associated with the sample text data; and performing unsupervised training on the initial speech synthesis model according to the combined feature and the pause hidden feature distribution, wherein the performing unsupervised training on the initial speech synthesis model according to the combined feature and the pause hidden feature distribution comprises:

determining a combined feature vector representation according to the combined feature;

obtaining an output of a first encoder by using the combine feature representation as an input of the first encoder;

obtaining spectrum features of phonemes and pause characters in the combined feature by using an output of the first encoder and a spectrum feature of the sample audio data associated with the sample text data as an input of a first attention layer;

obtaining the pause hidden feature distribution by using spectrum features of the pause characters in the combined feature as an input of a second encoder;

performing sampling on the pause hidden feature distribution to obtain a hidden feature;

obtaining an output of a third encoder by using the combined feature representation as an input of the third encoder;

obtaining a final output of the third encoder by concatenating the output of the third encoder and the hidden feature; and obtaining an acoustic feature based on the final output of the third encoder.

* * * * *